Figure 1:
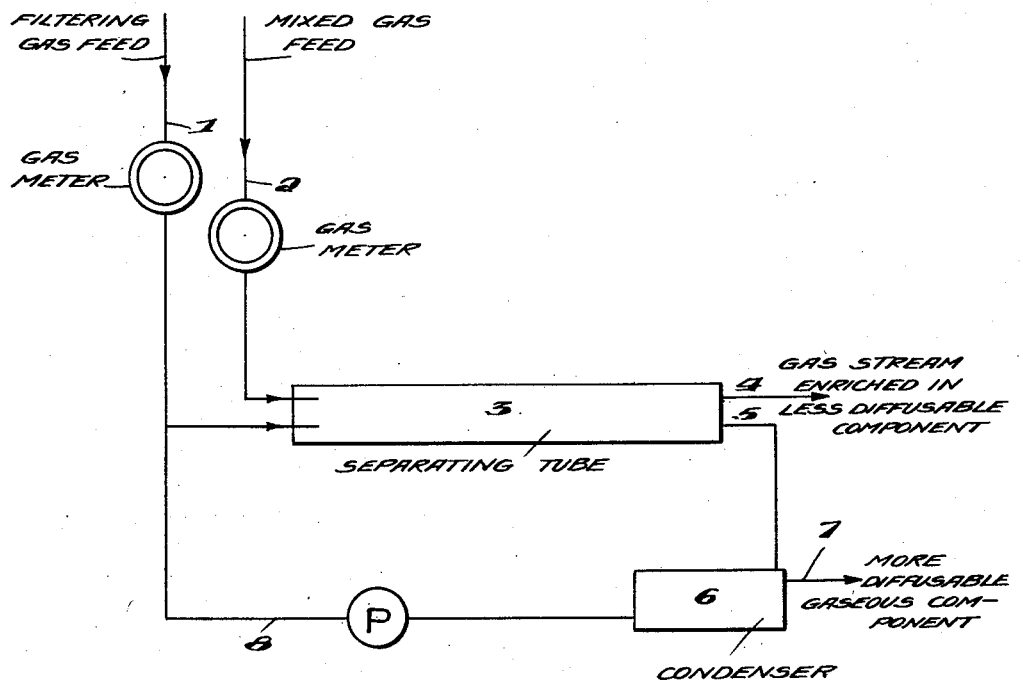

Sept. 1, 1959 A. M. HENKE ET AL 2,902,111
DIFFUSION PROCESS AND APPARATUS
Filed July 12, 1957 2 Sheets-Sheet 1

INVENTORS
A. M. HENKE,
W. A. HORNE,
BY
ATTORNEY

Sept. 1, 1959   A. M. HENKE ET AL   2,902,111
DIFFUSION PROCESS AND APPARATUS
Filed July 12, 1957   2 Sheets-Sheet 2
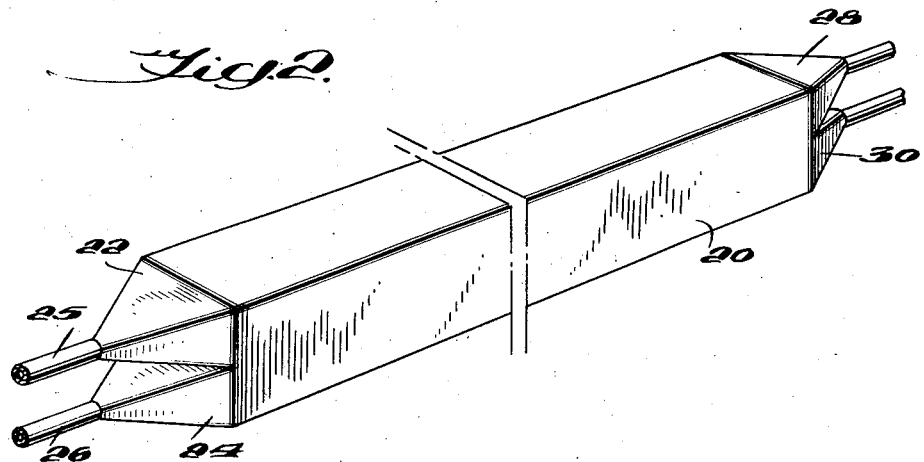
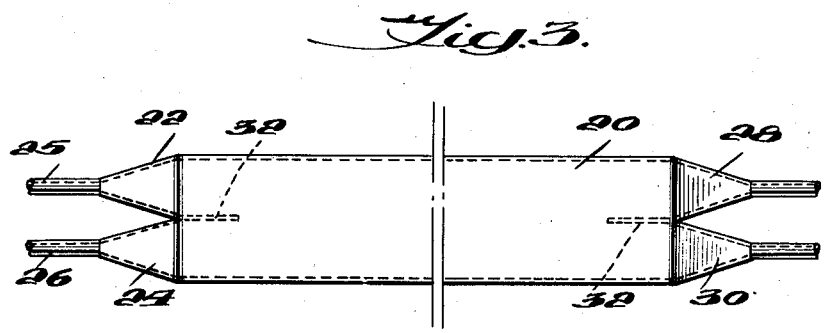
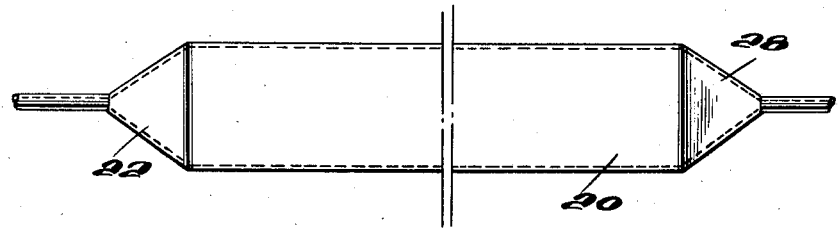
INVENTORS
A.M. HENKE,
W.A. HORNE,
BY
ATTORNEY

United States Patent Office 2,902,111
Patented Sept. 1, 1959

2,902,111

DIFFUSION PROCESS AND APPARATUS

Alfred M. Henke, Springdale, and William A. Horne, Oakmont, Pa., assignors to Gulf Research & Development Company, Pittsburgh, Pa., a corporation of Delaware Application July 12, 1957, Serial No. 671,497

9 Claims. (Cl. 183—2)

This invention relates to a process and apparatus for the separation of components of mixtures of gases and more particularly to a method and apparatus for concentrating a component of a mixture of gases by molecular filtration of the more diffusible component into a separate filtering or screening gas.

In refinery operations certain processes evolve gases which contain varying amounts of hydrogen while other processes require the use of high purity hydrogen. Obvious economic and technical advantages result if the hydrogen for process feed is supplied by a separation and concentration of the gases evolved in the various stages of petroleum refining.

Heretofore the chief method of separating gaseous mixtures has been that of fractional distillation wherein the less volatile component of the gaseous mixture to be separated is separated from the more volatile component or components by a process of partial condensation and partial vaporization. However, fractional distillation of mixtures of low boiling gases, such as are evolved in the various stages of petroleom refining, is difficult and expensive because the boiling points of these gases are so low and so close together that partial condensation is difficult to attain. We have now developed a novel method and apparatus for separating or concentrating low boiling gases, based on certain principles of molecular filtration or diffusion.

Diffusion methods heretofore employed to separate gaseous mixtures make use of a gas permeable diaphragm, slit or membrane through which is filtered the more diffusible component of the mixture to be separated. This type of process requires careful selection of a membrane having pores of a highly critical size. Furthermore, these pores are easily clogged thus rendering the process inoperative. In contrast, our process separates gases by diffusion without the use of a membrane, diaphragm or the like by contacting a gaseous mixture with a filtering gas in an unobstructed separation zone.

Our invention is based on the discovery that the more diffusible component of a gas mixture can be selectively concentrated by flowing the gas in contact with a condensable filtering gas which, preferably, has a lower relative volatility than any component of the mixture to be separated. When two different gases diffuse into the same filtering gas the speed of diffusion will be different. The difference will be more pronounced in gases with widely different molecular weights. The theory of kinetics makes it possible, for example, to calculate that hydrogen diffuses three times more rapidly than does methane, oxygen or nitrogen.

In general, our process comprises flowing a gaseous mixture and a condensable filtering gas through an unobstructed isothermal separating zone in horizontal, parallel and laminar flow, the more dense of said gas streams being flowed in laminar flow below the other, thus allowing the more diffusible constituent of the gaseous mixture to diffuse into the filtering gas. In the preferred embodiment, the filtering gas withdrawn from the separating zone is then condensed, thereby releasing a gas richer in the more diffusible component, and the filtering gas is revaporized and recirculated to the separation zone. Thus, novel and essential features of our invention reside in the fact that the gas mixture and the filtering gas flow horizontally, concurrently and in parallel through a substantially isothermal filtering or separation zone. The more diffusible component diffuses into the condensable filtering gas and a concentrated stream of that component is recovered by condensing the filtering gas.

Our molecular filtration separation process is specifically applicable in the separation of refinery gases to concentrate the hydrogen in these gases for use in other refinery processes. A typical refinery gas contains methane, hydrogen and other low boiling hydrocarbons. Less volatile gases can be separated rather easily; the more difficult problem arises in the separation of low boiling gases, such as methane, from hydrogen.

Our invention also includes a novel apparatus in which our process can be carried out. The apparatus comprises an elongated, horizontal chamber of uniform cross sectional area. The chamber is provided at one end thereof with a pair of inlet ports one of which overlies the other and an aligned pair of outlet ports at the opposite end. The upper port at each end of the chamber is co-extensive with an upper portion of the end of the chamber and the lower port is co-extensive with the remainder of the end of the chamber. The upper and lower ports at each end of the chamber are contiguous on a horizontal line extending across each end of the chamber. Each port is provided with a tapered conduit means which is co-extensive at its enlarged end with its corresponding port. The conduit means for the inlet ports are connected at the small ends thereof with piping for introducing gas streams and the conduit means for the outlet ports are connected at the small ends thereof with piping for withdrawing gas streams. The chamber is provided internally at each end thereof with a horizontal, rectangular baffle that extends laterally across the chamber along the line of intersection of the ports and longitudinally a short distance into the chamber. The chamber is otherwise unobstructed internally.

Our invention will now be described in more detail by reference to the drawings. Figure 1 is a highly schematic diagram of the flow of the process and of apparatus in which the process can be carried out. Figures 2, 3 and 4 illustrate a preferred embodiment of our novel apparatus.

As shown in Figure 1, a filtering gas stream, for example, a stream of butane, is introduced via line 1 into the lower half of a separating tube 3. A gaseous mixture to be separated, for example, a feed mixture of hydrogen and methane, is introduced by line 2 into the upper half of chamber 3. The butane stream, being the more dense of the two gas streams, flows in streamline flow through the lower half of the separating chamber 3 while the less dense stream of hydrogen and methane flows in laminar flow above the stream of butane filtering gas through the chamber 3. As the two parallel streams pass through the separating chamber the hydrogen of the feed mixture diffuses into the butane stream more rapidly than the methane, thus forming a hydrogen rich gas in admixture with the stream of butane. Two gas streams are withdrawn through lines 4 and 5 from the exit end of the separating chamber 3. The upper stream withdrawn through line 4 is enriched in the less diffusible component of the feed mixture introduced by line 2, in this case methane. The filtering gas enriched in the more diffusible component of the feed mixture, in this case hydrogen, is withdrawn through line 5 and passed to suitable means for separating the filtering gas from the diffusible component of the feed mixture.

In the preferred embodiment of the process the filtering gas is an easily condensable gas, that is to say, a gas with a considerably lower volatility than the components of the feed mixture. Therefore, the filtering gas is readily separated from the diffusible component of the feed mixture by condensation. The gas stream in line 5 is passed to condenser 6 wherein the butane is condensed and an uncondensed gas, rich in hydrogen, is withdrawn via line 7. The butane after being revaporized is recirculated by line 8 to the lower half of the separating chamber 3.

As we have stated, an essential feature of our invention is that the gas mixture to be separated and the filtering gas are passed in laminar, concurrent flow through the separating chamber. To ensure the maintenance of laminar, concurrent flow, our process embodies other essential features. Thus, for example, it is essential that the gas stream be flowed horizontally through the separating chamber. It is also essential that the more dense of the two gas streams be flowed through the lower level of the separating chamber while the less dense gas flows above it. This avoids non-diffusional mixing of the gas streams by gravitational effects. Another essential feature is that the separating chamber is maintained at substantially uniform temperature throughout, thus avoiding convection currents which could cause mixing of the gas streams other than the desired diffusion.

As we will explain more fully, our process can be carried out satisfactorily for most separations at room temperature. When carried out at room temperature no unusual care is required to maintain the separating chamber of uniform temperature throughout. However, in the event that the separation is carried out at temperatures substantially above or below room temperature the separation chamber may be provided with suitable heating or cooling means, not shown in the drawing, so as to maintain an isothermal separating zone.

Figures 2, 3 and 4 show preferred embodiments of our apparatus which are particularly effective in ensuring laminar flow of the gas streams and the avoidance of turbulence. Figure 2 is a view in perspective of an apparatus in accordance with our invention. The apparatus comprises the separating chamber 20 which is of substantially uniform cross sectional area throughout its extent. The chamber need not be of rectangular cross section as shown in the drawing, but should be of uniform shape throughout its extent to promote the streamline flow of the gas streams. At its inlet end the apparatus is provided with a pair of inlet ports, one of which overlies the other, and an aligned pair of outlet ports are provided at the exit end of the chamber. At each end of the chamber the upper port is co-extensive with the upper portion of the end of the chamber. In the embodiment shown in the drawing the upper port covers the upper half of each end of the chamber and the lower port covers the lower half. The two ports are contiguous on a horizontal line that extends across the end of the chamber. In the apparatus of the drawing the intersection of the two ports is a line extending across the middle of each end of the chamber. This structure is desirable when the feed mixture and the filtering gas are flowed at equal rates. If their rates are not equal, an apparatus providing larger ports for the more rapidly flowing stream may be desirable.

Each of the ports is provided with a tapered conduit means for introducing or withdrawing as gas stream. Each conduit means is co-extensive at its enlarged end with its corresponding port. For example, the enlarged end of conduit means 22 covers the upper inlet port of chamber 20 and the enlarged end of conduit means 24 covers the lower inlet port of chamber 20. Each conduit means at its smaller end is connected with piping for introducing or withdrawing gas. Thus, the conduit means 22 connects at its smaller end with piping 25 for introducing a gas mixture and conduit means 24 is connected at its smaller end with the piping 26 for introducing filtering gas. The conduits 22, 24, 28 and 30 are shown in the drawing as being of pyramidal shape. However, other tapered structures, e.g., conical, can be used, the essential feature being that the structure is conducive to the introduction or withdrawal of a streamline flow of gas.

In our preferred apparatus as shown in Figure 3, the apparatus is provided with internal horizontal baffles 32. These baffles are rectangular plates that extend between the vapor inlet and outlet conduits inwardly toward the middle of the separating chamber. They serve to reduce turbulence at the inlet and exit ends of the chamber. In effect, they are extensions of the inlet and outlet conduits and the vapor streams are not in contact when above or below the baffles. Therefore, strictly speaking, the zone of diffusion or the separating zone exists only in the region between the baffles and, as we have indicated, the separating zone itself is unobstructed internally. That is to say, there is no structure within the separating zone that would deflect the gas streams or interfere with their laminar contact as they flow through the separating zone.

Considerable latitude is possible in the choice of a filtering gas for our process. However, since condensation is the most convenient and economical method for separating the filtering gas from the diffused components of the feed mixture present in it, we prefer to use a filtering gas that has a considerably lower volatility than any component of the feed mixture. Preferably, the relative volatility of the filtering gas with respect to the least volatile component of the gas mixture to be separated is less than 0.8. As we will describe in the specific examples hereinafter, we have used n-butane as the filtering gas for separating hydrogen from methane. The ease of separation of n-butane from hydrogen by condensation makes n-butane a particularly satisfactory filtering gas for this particular operation. n-Butane, although gaseous at room temperature, can be liquefied by cooling to slightly below 0° C. Therefore, when n-butane is used as a filtering gas, heating of the separation tube can be avoided and condensation of the n-butane to release a diffused gas rich in hydrogen can be accomplished with only moderate cooling. We have also used propane and n-hexane with highly satisfactory results. In general, any of the lower molecular weight, relatively non-reactive hydrocarbons such as the $C_3$ to $C_7$ paraffins, are very satisfactory for use as the filtering gas in separating hydrogen from refinery gases.

Our molecular filtration process can be operated successfully at room temperature and atmospheric pressure as well as at considerably higher or lower temperatures and pressures. The upper limit of temperature is governed by the thermal stability of the materials being separated. An essential feature of the invention is the concurrent, laminar flow of the gases through the filtering tube. Decomposition of the gases must be avoided as it would tend to create turbulence and interfere with the laminar flow. When the process is utilized for the separation of materials that will require the separation zone to be heated to keep the mixed gases and filtering gas in the vapor state, a constant temperature must be maintained in the separation zone to avoid convection currents which would upset the laminar flow of the gases and cause mixing.

Our method will work successfully at sub-atmospheric or super-atmospheric pressure in a system where such operation is advantageous, since pressure has little or no effect on the relative diffusibilities of the materials being separated. The most economically attractive conditions for operation are room temperature and atmospheric pressure. Other advantages combine to make these preferred operating conditions.

We have performed a number of specific separation runs that illustrate various important features of the invention. Certain of these runs are described in the examples which follow:

EXAMPLE 1

We have conducted a series of runs in accordance with our method which show the effect of contact time or diffusion time. A mixture of 63% hydrogen and 37% methane was passed through a filtering tube 4 inches in diameter and 30 inches long. Normal butane was used as the filtering gas. The mixed gases and filtering gas were fed into the tube in a 1:1 ratio. Product streams were withdrawn in the same ratio. The average retention time in the tube was varied from 32 to 71 seconds by varying the flow rates. The results of these operations are tabulated below.

Table I

| Run No. | Flow Rate, STP, Cu. Ft./Hr. | | Contact Time, Sec. | Enriched Hydrogen Gas [a] | |
|---|---|---|---|---|---|
| | Mixed Gas | Filtering Gas | | Hydrogen Concentration, Percent by Volume | Hydrogen Recovery, Percent of Hydrogen in Mixed Gas |
| 1 | 12 | 12 | 32 | 89.2 | 17.4 |
| 2 | 8 | 8 | 49 | 86.0 | 23.0 |
| 3 | 6 | 6 | 65 | 82.3 | 28.5 |
| 4 | 4 | 4 | 71 | 80.6 | 33.0 |

[a] n-Butane free basis.

The data illustrate that the purest hydrogen product is obtained with the shortest contact time. Improved recovery of hydrogen but lower purity results with longer contact time. If high purity of the more diffusible component is desired and the system is operated in a multi-pass or multi-unit operation, short contact times give the best results. In single pass systems where high hydrogen recovery is desired, longer contact times are more desirable.

EXAMPLE 2

We have carried out another series of runs at constant contact time which show the most effective ratios of mixed gas to filtering gas. The contact time was 49 seconds, the mixed gas 63% hydrogen and 37% methane and the filtering gas normal butane. A tube 4 inches in diameter and 30 inches long was used. Product streams were withdrawn at ratios equal to the feed gas ratios. The results are tabulated below.

Table II

| Run No. | Flow Rate, STP, Cu. Ft./Hr. | | Mixed Gas: Filtering Gas, Vol./Vol. | Enriched Hydrogen Gas [a] | |
|---|---|---|---|---|---|
| | Mixed Gas | Filtering Gas | | Hydrogen Concentration, Percent by Volume | Hydrogen Recovery, Percent of Hydrogen in Mixed Gas |
| 5 | 3 | 13 | 0.23 | 76.6 | 67.4 |
| 6 | 6 | 10 | 0.60 | 81.0 | 40.6 |
| 7 | 8 | 8 | 1.00 | 86.0 | 23.0 |
| 8 | 10 | 6 | 1.67 | 80.0 | 28.0 |

[a] n-Butane free basis.

An examination of this data indicates the greatest concentration of the more diffusible component results when the ratio of mixed gas to filtering gas is 1:1. Increasing the amount of mixed gas results in improved recovery of the more diffusible component but lower concentration of this component. The differences noted on increasing the amount of mixed gas are less marked. An improvement in recovery results when the amount of mixed gas is increased.

In the systems where the process is run as a multi-stage or recycle process and high purity of the more diffusible component is desired a ratio of mixed gas to filtering gas of 1:1 is most desirable. If a maximum recovery of the more diffusible gas is desired, the volume of mixed gas feed should be increased and the volume of filtering gas decreased.

EXAMPLE 3

We have conducted another series of runs using separation tubes of different lengths which show the effect of changes in the ratio of the diameter of the separation tube to the length of the tube. In each of these runs we used a tube 4 inches in diameter, a feed gas mixture of 63% hydrogen and 27% methane, and normal butane as the filtering gas. Feed gas to filtering gas ratios of 1:1 and 1:1.66 were used. The results are tabulated below.

Table III

| Run No. | Flow Rate, STP, Cu. Ft./Hr. | | Tube Length, In. | Contact Time, Sec. | Enriched Hydrogen Gas [a] | |
|---|---|---|---|---|---|---|
| | Mixed Gas | Filtering Gas | | | Hydrogen Concentration, Percent by Volume | Hydrogen Recovery, Percent of Hydrogen in Mixed Gas |
| 9 | 6 | 6 | 15 | 32.5 | 86.5 | 21.4 |
| 10 | 6 | 6 | 30 | 65 | 82.3 | 28.5 |
| 11 | 6 | 6 | 48 | 97.5 | 76.3 | 45.0 |
| 12 | 6 | 10 | 15 | 24.4 | 86.6 | 28.4 |
| 13 | 6 | 10 | 30 | 48.8 | 81.0 | 40.6 |
| 14 | 6 | 10 | 48 | 73.2 | 76.3 | 51.1 |

[a] n-Butane free basis.

Changes in the tube length result in changes in contact time or diffusion time. The data of Table III show greater hydrogen concentration and smaller hydrogen recovery in the shorter tubes with decreasing hydrogen concentration but increased hydrogen recovery as the tubes are lengthened. These results agree with the results for varying contact times presented in Table I.

The maximum time of contact in the separation zone must be worked out for each gas to be separated. Since the ratio of diffusion of the gases to be separated into the filter gas is lower at the outlet end of the separation zone than at the inlet end, there is a greater concentration of the most diffusible gas at the inlet end. Thus in concentrating hydrogen from a $H_2$—$CH_4$ mixture using a butane filter gas, the rate of diffusion of methane into the butane stream equals the rate of diffusion of hydrogen into the butane stream when the maximum time of contact in the separation zone has been reached. In view of this phenomenon further purification of the hydrogen must be carried out in subsequent stages rather than by using a very long separating tube.

EXAMPLE 4

The effect of filtering tube diameter was evaluated by using a mixed gas composed of 63% hydrogen and 37% methane and normal butane as the filtering gas. The volume ratios of feed gas to filtering gas was 1:1. The tube length was 30 inches and the tube diameter was varied, 2 inch, 3 inch, 4 inch and 6 inch tubes being used. The results are tabulated below.

Table IV

| Run No. | Tube Diameter | Contact Time, Sec. | Enriched Hydrogen Gas [a] | |
|---|---|---|---|---|
| | | | Hydrogen Concentration, Percent by Volume | Hydrogen Recovery, Percent Hydrogen in Mixed Gas |
| 15 | 2 | 5 | 79 | 43.5 |
| 16 | 3 | 5 | 85 | 27 |
| 17 | 4 | 5 | 89 | 19 |
| 18 | 6 | 5 | 84 | 23 |
| 19 | 2 | 10 | 73 | 49 |
| 20 | 3 | 10 | 82 | 33 |
| 21 | 4 | 10 | 86.5 | 23 |
| 22 | 6 | 10 | 83 | 25 |
| 23 | 2 | 15 | 69 | 58 |
| 24 | 3 | 15 | 79 | 39 |
| 25 | 4 | 15 | 83 | 29 |
| 26 | 6 | 15 | 82 | 27 |

[a] n-Butane free basis.

The 2 inch tube allowed hydrogen recoveries of 10 to 20% higher than tubes of larger diameter at equal contact times. This is probably due to the improved ratio of cross sectional area for diffusion to cross sectional area for flow in the small tube. The hydrogen concentration increases with increased tube diameter but goes through a maximum when 4 inch tubes are used. The hydrogen concentration decreased appreciably when a tube 6 inches in diameter was used.

This undesirable purity versus recovery relationship can be corrected by using the apparatus shown in Figure 2. In this structure the separating chamber has a rectangular cross section and the inlet and outlet ports form apertures across the entire width of the apparatus at each end thereof. The purpose of having the inlet and outlet ports taper from a smaller to a larger cross sectional area is to prevent turbulence and promote streamline flow. The tube is provided with interior, horizontal baffles 32 at the inlet and outlet ends which aid in preventing mixing of the streams in the region of the ports.

EXAMPLE 5

The runs described above were conducted with a mixed gas containing 63% hydrogen and 37% methane. We have conducted another series of runs with different ratios of hydrogen to methane in the feed gas mixture. The results of the runs show the feasibility of staged operation, that is to say, an operation in which the hydrogen-rich gas obtained as the product of one stage is used as the feed to a subsequent stage, the product of the subsequent stage being thus further enriched in hydrogen. The number of stages will depend on the ultimate purity desired. In this series of runs a tube 4 inches in diameter and 30 inches long was used and the mixed gases and butane were passed through the tube in 1:1 ratio by volume. The results are tabulated below.

Table V

| Run No. | Mixed Gas Composition, Percent by Volume | | Total Gases, Feed Rate, Cu. Ft./Hr. | Enriched Hydrogen Gas [a] | |
|---|---|---|---|---|---|
| | H₂ | CH₄ | | Hydrogen Concentration, Percent by Volume | Hydrogen Recovery, Percent of Hydrogen in Mixed Gas |
| 27 | 84 | 16 | 16 | 94.0 | 27.5 |
| 28 | 64 | 37 | 16 | 82.8 | 26.7 |
| 29 | 23 | 77 | 16 | 54.5 | 24.0 |
| 30 | 84 | 16 | 24 | 95.2 | 21.0 |
| 31 | 63 | 37 | 24 | 89.2 | 17.4 |
| 32 | 23 | 77 | 24 | 50.5 | 35.0 |

[a] n-Butane free basis.

A greater than two-fold hydrogen enrichment resulted on single pass operation when a gas containing only 23% hydrogen was used as a feed. The hydrogen content of a gas feed containing 64% hydrogen was increased to 83% by one pass through the separation tube. A gas containing 94% hydrogen can be recovered by one pass of a feed containing 84% hydrogen through the separation tube.

These results show that the process can be used as a multiple step process and that substantially pure hydrogen can be recovered from refinery gases.

EXAMPLE 6

Normal butane was used as the filtering medium in the first five examples. We have compared normal propane and normal butane as filtering media, using a mixed gas composed of 63% hydrogen and 37% methane, and a contact time of 75-100 seconds. A filtering tube 30 inches long and 4 inches in diameter was used. The runs were at room temperature and atmospheric pressure. The results are tabulated below.

Table VI

| Run No. | Filtering Gas | Flow Rate, STP, Cu. Ft./Hr. | | Enriched Hydrogen Gas [a] | |
|---|---|---|---|---|---|
| | | Mixed | Filtering | Hydrogen Concentration, Percent by Volume | Hydrogen Recovery, Percent Hydrogen in Mixed Gas |
| 33 | n-Butane | 6 | 6 | 82.3 | 28.5 |
| 34 | do | 6 | 10 | 81 | 40.6 |
| 35 | do | 8 | 8 | 76.9 | 43.9 |
| 36 | n-Propane | 6 | 6 | 80 | 31.5 |
| 37 | do | 6 | 10 | 79.5 | 42.5 |
| 38 | do | 8 | 8 | 75.9 | 46.7 |

[a] n-Butane free basis.

Table VI shows that in the runs in which normal propane was used the hydrogen concentration and recovery values were essentially the same as when normal butane was used as the filtering gas.

We have also used normal hexane as the filtering gas. In this operation the hydrogen recovery was markedly improved but the hydrogen concentration in the product stream was lower than with n-butane or n-propane. In the operation with normal hexane the diffusion tube was externally heated to prevent condensation in the tube. Heat losses through the walls of the tube probably caused convection currents in the tube and thus induced mixing. This could explain the lower hydrogen concentration obtained when using n-hexane as the filtering gas. This mixing can be overcome by rigid control of temperatures of the mixed gas and filtering gas and by design of the filtering tube as shown in Figures 2, 3, and 4, to prevent convection currents.

Our process has been shown to be particularly suitable for the concentration of hydrogen in refinery gases. However, other applications of the process can be made. The chief factor limiting the use of this process in gas separation is the stability of the gases in the mixture to be separated. Decomposition of these gases should be avoided since it would disturb the laminar flow of the gas stream.

Obviously many modifications and variations of the invention as hereinbefore set forth may be made without departing from the spirit and scope thereof and therefore only such limitations should be imposed as are indicated in the appended claims.

We claim:
1. A separation process which comprises passing a gaseous mixture and a condensable filtering gas in concurrent, horizontal, laminar flow through an unobstructed separating zone maintained at substantially constant temperature throughout its extent, and recovering two gas streams from said zone, one of said streams comprising said filtering gas enriched in a more diffusible component of said gaseous mixture.

2. A process for concentrating a component of a gaseous mixture which comprises passing the gaseous feed mixture and a condensable filtering gas in concurrent, horizontal, laminar flow through an unobstructed, isothermal separating zone, withdrawing two gas streams from said zone, one of said streams comprising said filtering gas and at least a portion of the more diffusible component of the feed mixture, condensing the filtering gas in said latter stream, thereby releasing a gas enriched in the more diffusible component of the gaseous mixture, revaporizing the filtering gas and recirculating said filtering gas to the separating zone.

3. A process for concentrating a component of a low boiling gaseous mixture which comprises passing the gaseous feed mixture and a condensable filtering gas in concurrent, horizontal, laminar flow through an unobstructed, isothermal separating zone, withdrawing two gas streams from said zone, one of said streams comprising said filtering gas and at least a portion of the more diffusible component of the feed mixture, condensing the filtering gas in said latter stream, thereby releasing a gas enriched in the more diffusible component of the gaseous mixture, revaporizing the filtering gas and recirculating said filtering gas to the separating zone.

4. A process for concentrating hydrogen contained in a refinery gas mixture which comprises passing the gas mixture and a condensable filtering gas in concurrent, horizontal, laminar flow through an unobstructed separating zone maintained at atmospheric temperature and pressure throughout its extent, withdrawing two gas streams from said zone, one of said streams comprising said filtering gas and hydrogen, condensing the filtering gas in said latter stream, thereby releasing a gas enriched in hydrogen, revaporizing the filtering gas and recirculating said filtering gas to the separating zone.

5. A process for concentrating hydrogen contained in a refinery gas mixture which comprises passing the refinery gas mixture and a filtering gas, comprising a hydrocarbon having from 3 to 7 carbon atoms in the molecule, in concurrent, horizontal, laminar flow through an unobstructed isothermal separating zone, the less dense of the two gas streams being flowed above the other, withdrawing two gas streams from said zone, condensing the filtering gas stream, thereby releasing a gas enriched in hydrogen, revaporizing the filtering gas and recirculating said filtering gas to the separating zone.

6. A process for concentrating hydrogen contained in a mixture of methane and hydrogen which comprises passing the gas mixture above and in concurrent, horizontal, laminar flow with a stream of butane vapor through an unobstructed, isothermal separating zone, withdrawing upper and lower gas streams from said zone, cooling said lower gas stream to condense said butane, thereby releasing a gas enriched in hydrogen, revaporizing said butane and recirculating said butane to the separating zone.

7. A process for concentrating hydrogen contained in a mixture of methane and hydrogen which comprises passing the gas mixture above and in concurrent, horizontal, laminar flow with a stream of normal propane vapor through an unobstructed, isothermal separating zone, withdrawing upper and lower gas streams from said zone, cooling said lower gas stream to condense said normal propane, thereby releasing a gas enriched in hydrogen, revaporizing said normal propane and recirculating said normal propane to the separating zone.

8. A process for concentrating hydrogen contained in a mixture of methane and hydrogen which comprises passing the gas mixture above and in concurrent, horizontal, laminar flow with a stream of normal hexane vapor through an unobstructed, isothermal separating zone, withdrawing upper and lower gas streams from said zone, cooling said lower gas stream to condense said normal hexane, thereby releasing a gas enriched in hydrogen, revaporizing said normal hexane and recirculating said normal hexane to the separating zone.

9. A gas separation apparatus which comprises an elongated, unobstructed, horizontal chamber of uniform cross sectional area throughout its extent, a pair of inlet ports at one end of said chamber one of which overlies the other and an aligned pair of outlet ports at the opposite end of said chamber, the upper port at each end of said chamber being co-extensive with an upper portion of the end of said chamber and the lower port being co-extensive with the remaining lower portion of the end of said chamber, the upper and lower ports at each end of said chamber being contiguous on a horizontal line extending across each end of said chamber, each of said ports being provided with a tapered conduit means, each of said conduit means being co-extensive at its enlarged end with its corresponding port, said conduit means for said inlet ports being connected at the small ends thereof with piping for introducing gas streams and said conduit means for said outlet ports being connected at the small ends thereof with piping for withdrawing gas streams.

References Cited in the file of this patent

FOREIGN PATENTS 488,245     Germany _____ Dec. 30, 1929